United States Patent
Kalagher et al.

(10) Patent No.: US 11,912,493 B2
(45) Date of Patent: Feb. 27, 2024

(54) DE-ICER SCRAPER CAP

(71) Applicant: PRESTONE PRODUCTS CORPORATION, Danbury, CT (US)

(72) Inventors: Thomas G. Kalagher, Torrington, CT (US); Joseph K. Mathews, Milford, CT (US); Robert Pivetz, Sherman, CT (US)

(73) Assignee: PRESTONE PRODUCTS CORPORATION, Danbury, CT (US)

( * ) Notice: Subject to any disclaimer, the term of this patent is extended or adjusted under 35 U.S.C. 154(b) by 0 days.

(21) Appl. No.: 15/719,271

(22) Filed: Sep. 28, 2017

(65) Prior Publication Data

US 2018/0244461 A1    Aug. 30, 2018

Related U.S. Application Data

(60) Provisional application No. 62/464,821, filed on Feb. 28, 2017.

(51) Int. Cl.
| | |
|---|---|
| *B65D 83/14* | (2006.01) |
| *B65D 83/20* | (2006.01) |
| *A47L 1/16* | (2006.01) |
| *B65D 83/22* | (2006.01) |
| *B60S 3/04* | (2006.01) |

(52) U.S. Cl.
CPC .............. *B65D 83/753* (2013.01); *A47L 1/16* (2013.01); *B60S 3/047* (2013.01); *B65D 83/205* (2013.01); *B65D 83/226* (2013.01); *B65D 83/228* (2013.01)

(58) Field of Classification Search
CPC ........ B65D 83/205; B65D 83/206; A47L 1/16
See application file for complete search history.

(56) References Cited

U.S. PATENT DOCUMENTS

| 708,709 | A | | 9/1902 | Henneberry | |
|---|---|---|---|---|---|
| 1,846,711 | A | | 2/1932 | Evensen | |
| D198,109 | S | | 4/1964 | Klun | |
| D198,110 | S | | 4/1964 | Klun | |
| 3,185,349 | A | * | 5/1965 | Sagarin | B65D 83/228 222/153.05 |
| 3,185,351 | A | * | 5/1965 | Klun | B65D 83/205 222/182 |
| 3,223,287 | A | * | 12/1965 | Sagarin | B65D 83/228 222/153.06 |

(Continued)

FOREIGN PATENT DOCUMENTS

JP        H11115961 A    *   4/1999

OTHER PUBLICATIONS

Prestone Windshield De-Icer 11 oz., accessed at: https://www.amazon.com/Prestone-Windshield-De-Icer-11-oz/dp/B000R2Z9E8/ref=sr_1_1?s=automotive&ie=UTF8&qid=1482447415&sr=1-1&keywords=prestone+windshield+de-icer. Available at least as of the filing date of the application.

(Continued)

*Primary Examiner* — David P Angwin
*Assistant Examiner* — Bradley S Oliver
(74) *Attorney, Agent, or Firm* — Barnes & Thornburg LLP; Mark J. Nahnsen (57) ABSTRACT

A dispenser cap includes a shell, a scraper coupled to the shell, and a fluid-delivery controller. The dispenser cap mounts on a spray can, and the fluid-delivery controller engages with a valve of the spray can to selectively dispense pressurized fluid from the spray can.

7 Claims, 7 Drawing Sheets

(56) References Cited

U.S. PATENT DOCUMENTS

| | | | |
|---|---|---|---|
| 3,225,966 A * | 12/1965 | Sagarin | B65D 83/205 222/394 |
| D203,895 S | 2/1966 | Klun | |
| D203,896 S | 2/1966 | Klun | |
| 3,302,235 A | 2/1967 | Gerber | |
| 3,305,179 A * | 2/1967 | Lehmann | B65D 83/205 222/182 |
| D208,224 S | 8/1967 | Crowell | |
| 3,367,540 A * | 2/1968 | Lehmann | B65D 83/20 222/153.06 |
| 3,373,908 A * | 3/1968 | Crowell | B65D 83/205 222/402.13 |
| 3,454,200 A * | 7/1969 | Kimura | B65D 83/205 222/402.1 |
| 3,651,993 A * | 3/1972 | Venus, Jr. | B65D 83/22 222/153.02 |
| 3,732,591 A | 5/1973 | Gach | |
| D255,426 S | 6/1980 | Kaufman | |
| D291,782 S | 9/1987 | O'Neil, Jr. | |
| 4,778,301 A | 10/1988 | Sicotte | |
| 5,070,819 A | 12/1991 | Helmstetter | |
| 5,106,221 A | 4/1992 | Oiot | |
| D333,788 S | 3/1993 | Geschwender | |
| D333,955 S | 3/1993 | Hatgas | |
| D356,259 S | 3/1995 | Hoyt | |
| D365,990 S | 1/1996 | McSwiggan | |
| 5,788,104 A | 8/1998 | Hoyt | |
| 6,006,396 A * | 12/1999 | Hellinger | B25G 3/18 15/236.01 |
| 6,969,828 B2 | 11/2005 | Deane, III | |
| D529,381 S | 10/2006 | Castillo Higareda | |
| D576,874 S | 9/2008 | Miller | |
| 7,832,955 B1 | 11/2010 | Leffew et al. | |
| D635,021 S | 3/2011 | Geier | |
| 7,992,741 B2 | 8/2011 | Hundley | |
| D652,218 S | 1/2012 | Hoffelner | |
| 8,475,070 B1 | 7/2013 | Miner | |
| D739,727 S | 9/2015 | Olson | |
| D751,781 S | 3/2016 | Blouin | |
| D781,704 S | 3/2017 | Olson | |
| D790,349 S | 6/2017 | Loritz | |

OTHER PUBLICATIONS

Prestone Windshield De-Icer, accessed at: http://prestone.com/products/print/431?popup=1. Available at least as of the filing date of the application.

Prestone Windshield De-Icer 17 oz. Aerosol, accessed at: https://www.amazon.com/Prestone-AS244-Windshield-Icer-Aerosol/dp/B00192ICQC/ref=sr_1_1?ie=UTF8&qid=1482447600&sr=8-1&keywords=prestone+as244+Windshield+De-Icer+17+oz+aerosol. Available at least as of the filing date of the application.

Tool Versed. The Best De-Icers. 2017 [earliest online date], [site visited Jul. 28, 2017]. Available from Internet, <URL:http://www.toolversed.com/general/the-best -de-icers/>.

* cited by examiner

DE-ICER SCRAPER CAP

CROSS-REFERENCE TO RELATED APPLICATIONS

This application claims priority under 35 U.S.C. § 119(e) to U.S. Provisional Application Ser. No. 62/464,821, filed Feb. 28, 2017, which is expressly incorporated by reference herein.

BACKGROUND

The present disclosure relates to a dispenser cap, and particularly to a dispenser cap for placement on a spray can to controllably dispense the contents of the spray can. More particularly, the present disclosure relates to a dispenser cap with an integral scraper for placement on a spray can to controllably dispense a de-icer compound from the spray can, while allow a user to use the product to clear ice from a windshield.

SUMMARY

According to the present disclosure, a dispenser cap includes a shell, a scraper coupled to the shell, and a fluid-delivery controller. The dispenser cap mounts on a spray can, and the fluid-delivery controller engages with a valve of the spray can to selectively dispense pressurized fluid from the spray can.

In illustrative embodiments, the shell, scraper, and fluid delivery controller are unitary. The fluid-delivery controller is coupled to shell by a hinge. One or more frangible webs extend from the fluid-delivery controller to one or more support posts of the shell. The frangible webs break away from the support posts when the fluid-delivery controller is pivoted on the hinge relative to the shell for the first time.

In illustrative embodiments, the fluid-delivery controller is coupled to shell by a hinge having two points of flexibility. One or more frangible webs extend from the fluid-delivery controller to the shell. The frangible webs break away from the support posts when the fluid-delivery controller is moved relative to the shell on the hinge for the first time.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figures 1, 2:
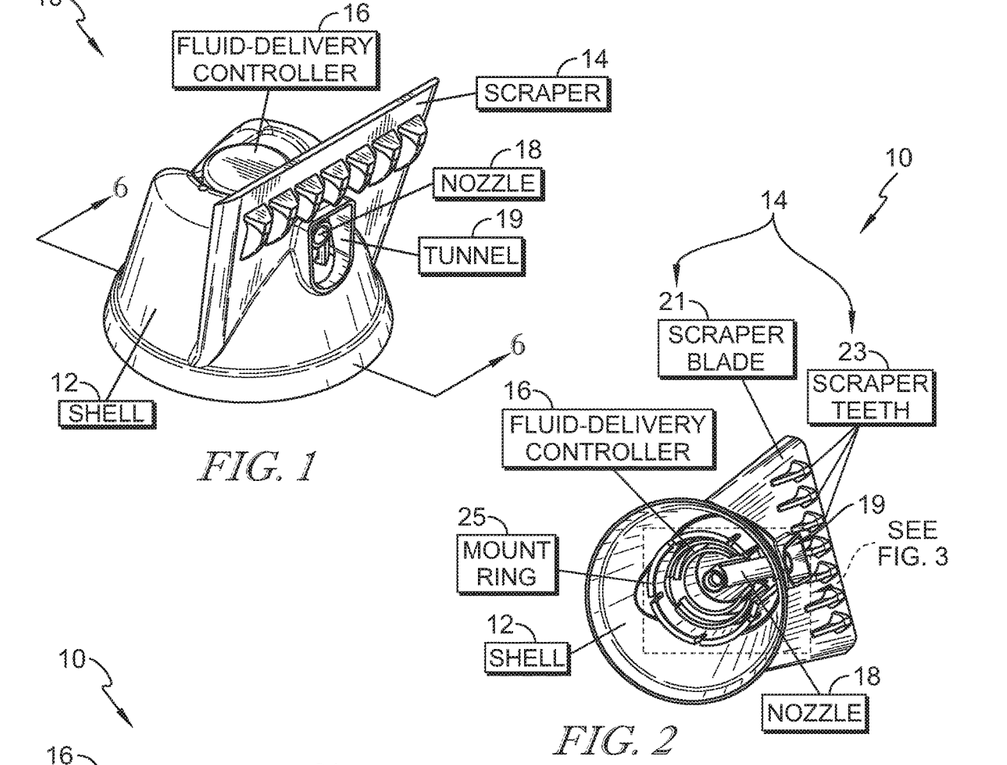
FIG. 1 is an upper perspective view of a de-icer dispenser cap in accordance with the present disclosure showing that the dispenser cap includes a shell, a scraper extending upward from the shell, and a fluid-delivery controller coupled to the shell and suggesting that a nozzle coupled to the fluid-delivery controller extends into a tunnel to allow dispense of a de-icer compound from a spray can that the dispenser cap is attached to as suggested in FIGS. 4-7.
FIG. 2 is a lower perspective view of the dispenser cap of FIG. 1 showing that the scraper includes a scraper blade coupled to the shell and scraper teeth coupled to the blade and suggesting that a mount ring coupled to the shell engages with a rim of the spray can to mount the dispenser cap on the spray can as suggested in FIG. 7.

A de-icer dispenser cap 10 in accordance with the present disclosure includes a dome-shaped shell 12, a scraper 14 extending upward from shell 12, and a fluid-delivery controller 16 coupled to shell 12 as shown in FIG. 1. Shell 12, scraper 14, and fluid-delivery controller 16 are unitary and integrally molded together as suggested in FIGS. 3 and 6. De-icer dispenser cap 10 is configured to mount on a spray can 100, 200 to form a de-icer system as suggested in FIGS. 4 and 8. Fluid-delivery controller 16 is configured to dispense the pressurized contents of spray can 100, 200, such as a de-icer compound, through a nozzle 18 at the selection of a user to aid in the removal of ice from a car window, for example, using scraper 14 as suggested in FIG. 7.

Shell 12 is formed to include a tunnel 19 as shown in FIG. 1. Nozzle 18 of fluid-delivery controller 16 extends into tunnel 19. In some embodiments, tunnel 19 cooperates with nozzle 18 to generally direct pressurized fluid in a single direction and to block peripheral spray of the pressurized fluid. In some embodiments, tunnel 19 engages with nozzle 18 to provide an upper and lower stop to limit movement of nozzle 18 relative to shell 12. Scraper 14 includes a scraped blade 21 and scraper teeth 23 coupled to scraper blade 21 as suggested in FIG. 2. Scraper blade 21 and scraper teeth 23 form cutting edges configured to engage with and break apart ice formed on a car window, for example.

Fluid-delivery controller 16 extends into an interior region of shell 12 as suggested in FIG. 2. A mount ring 25 is coupled to shell 12 and generally concentric with fluid-delivery controller 16. Mount ring 25 is configured to engage with spray can 100, 200 to hold de-icer dispenser cap 10 on spray can 100, 200 such that fluid-delivery controller 16 is engaged with a valve stem 108, 208 of spray can 100, 200, respectively, as suggested in FIGS. 7 and 10.

Figure 3:
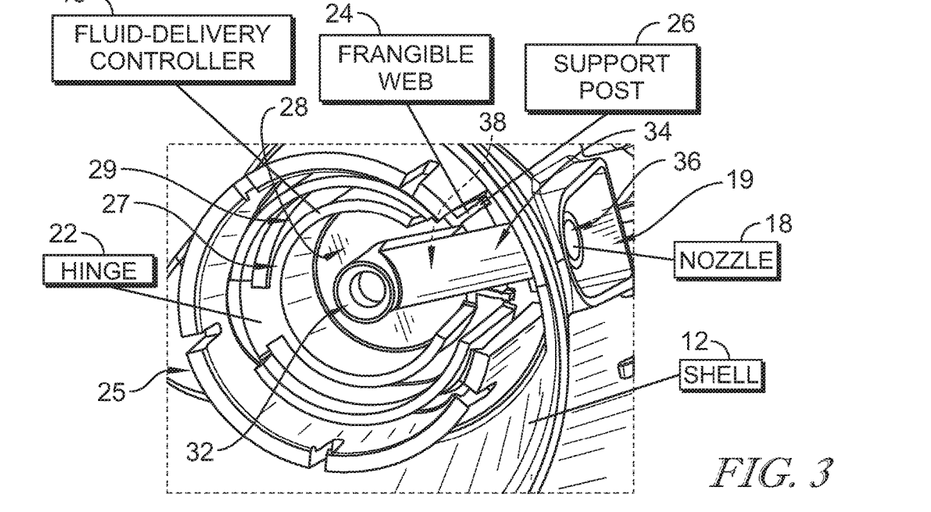
FIG. 3 is an enlarged view of FIG. 2 showing that the fluid-delivery controller is coupled to the shell by a hinge for movement relative to the shell and frangible webs coupled to support posts extending from the shell and suggesting that the fluid-delivery controller is formed unitary with the shell.
Figure 5:
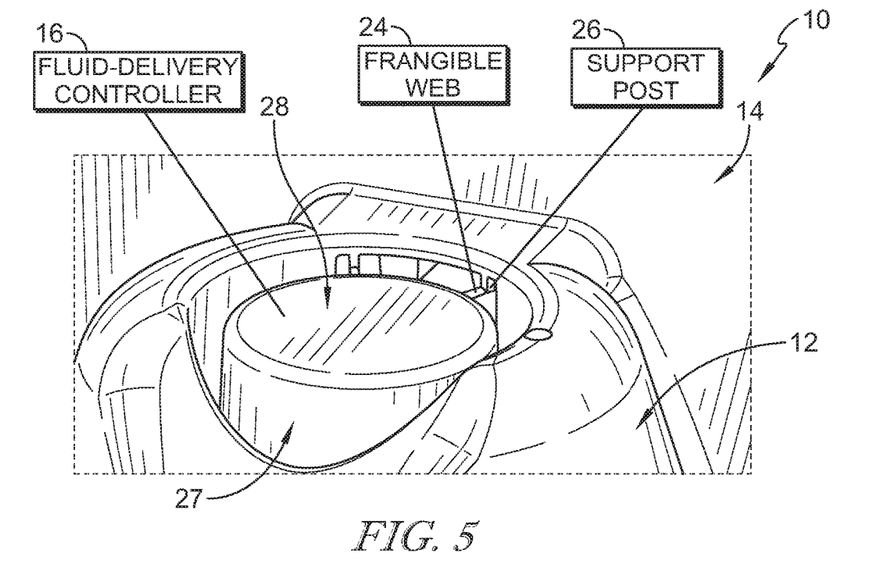
FIG. 5 is an enlarged view of the dispenser cap of FIG. 4 showing the frangible webs extending from the fluid-delivery controller to attach with the support posts and suggesting that the frangible webs break away from the support posts as a user depresses the fluid-delivery controller.

Fluid-delivery controller 16 is coupled to shell 12 by a hinge 22 as shown in FIG. 3. A frangible web 24 extends from fluid-delivery controller 16 and engages with a support post 26 of shell 12 as suggested in FIGS. 3 and 5. Hinge 22, frangible web 24, and support post 26 integrally connect fluid-delivery controller 16 with shell 12. De-icer dispenser cap 10 is formed such that shell 12 and fluid-delivery controller 16 are unitary which eliminates one or more steps in a manufacturing process for a fluid-delivery controller to be assembled with a shell. In some embodiments, de-icer dispenser cap 10 is formed by injection molding as a single, unitary structure. Such arrangement makes assembly of the de-icer dispenser cap 10 onto the spray can 100 as the fluid delivery controller 16 does not need to be installed in a separate step.

Hinge 22 is configured to allow fluid-delivery controller 16 to pivot relative to shell 12 as suggested in FIG. 3. Frangible webs 24 are configured to limit movement of fluid-delivery controller 16 during shipping of de-icer dispenser cap 10 and during assembly of de-icer dispenser cap 10 with spray can 100, 200 to form a de-icer system. Frangible webs 24 are also configured to break away from support posts 26 when a user engages fluid-delivery controller 16 to dispense the contents of spray can 100, 200 for the first time.

Fluid-delivery controller 16 includes a button wall 27 coupled to hinge 22 and a button grip 28 coupled to button wall 27 as shown in FIG. 3. Button wall 27 extends into a button aperture 29 of shell 12 to engage with hinge 22. Nozzle 18 is coupled to button grip 28. Nozzle 18 includes a valve-stem receiver 32 coupled to button grip 28 and a spout 34 extending from valve-stem receiver 32 into tunnel 19. An outlet aperture 36 of spout 34 is fluidly connected to valve-stem receiver 32 by a passageway 38 such that fluid can be delivered through valve-stem receiver 32 and out of outlet aperture 36.

Figure 4:
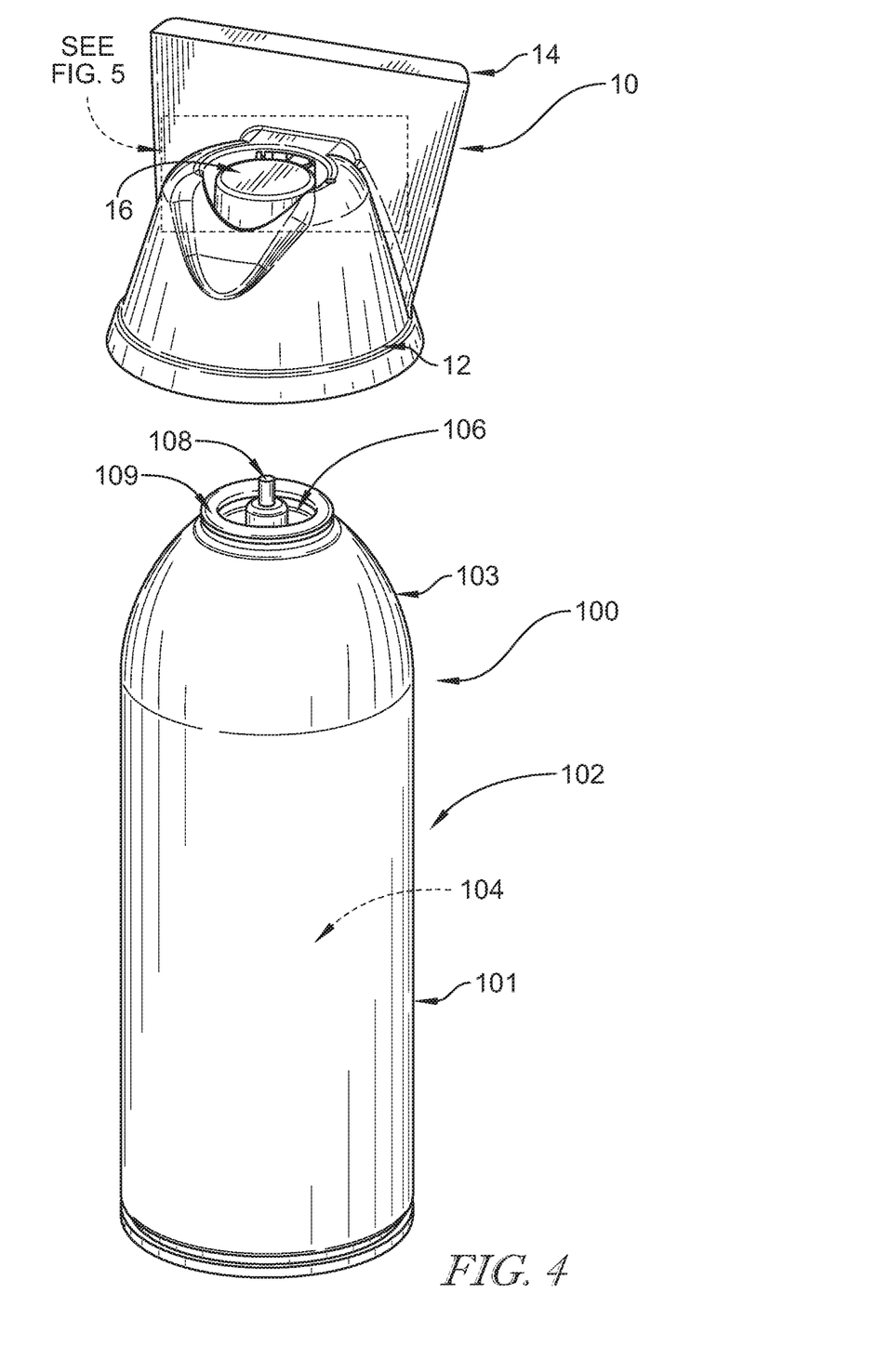
FIG. 4 is a perspective view of the dispenser cap of FIG. 1 showing the dispenser cap positioned over one embodiment of a spray can before mounting of the dispenser cap on the spray can.

One embodiment of a spray can 100 includes a container 102 formed to define an interior storage region 104 and a valve 106 coupled to container 102 as suggested in FIG. 4. Valve 106 seals interior storage region 104 to allow pressurized fluid, such as a de-icer compound, to be stored in container 102 and selectively dispensed through valve 106. Valve 106 and container 102 meet at a rim 109. In some embodiments, valve 106 and container 102 are formed separately and joined together. In some embodiments, rim 109 is formed at a rolled joint between valve 106 and container 102. In the illustrative embodiment, container includes a cylindrical wall 101 and a dome wall 103 coupled to cylindrical wall 101.

Figure 6:
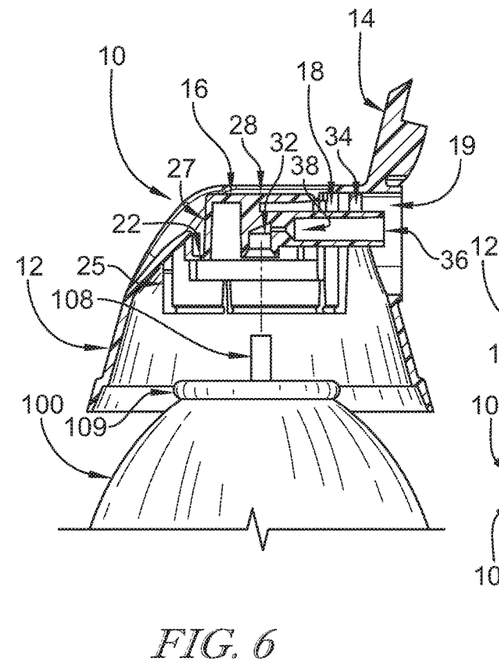
FIG. 6 is a sectional view of the dispenser cap taken along line 6-6 in FIG. 1 showing a valve stem of the spray can aligned with a valve-stem receiver of the dispenser cap during mounting of the dispenser cap on the spray can.
Figure 7:
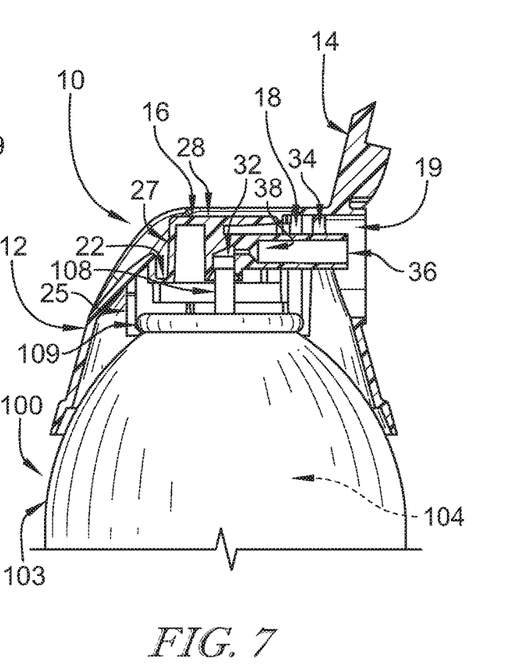
FIG. 7 is a view similar to FIG. 6 showing the dispenser cap mounted on the spray can such that the valve stem extends in to the valve-stem receiver and suggesting that the mount ring engages with the rim of the spray can to hold the dispenser cap on the spray can and that the shell extends along a dome wall of the spray can.

Mount ring 25 of de-icer dispenser cap 10 is configured to engage with rim 109 to hold de-icer dispenser cap 10 on spray can 100 and form a de-icer system as suggested in FIGS. 6 and 7. Shell 12 extends along dome wall 103 and at least partially surrounds valve 106. A valve stem 108 of valve 106 is received in valve-stem receiver 32 when de-icer dispenser cap 10 is mounted on spray can 100. A user engages button grip 28 to depress fluid-delivery controller 16 and to move valve stem 108 to allow pressurized fluid within spray can 100 to flow through valve 106 and nozzle 18.

Figure 8:
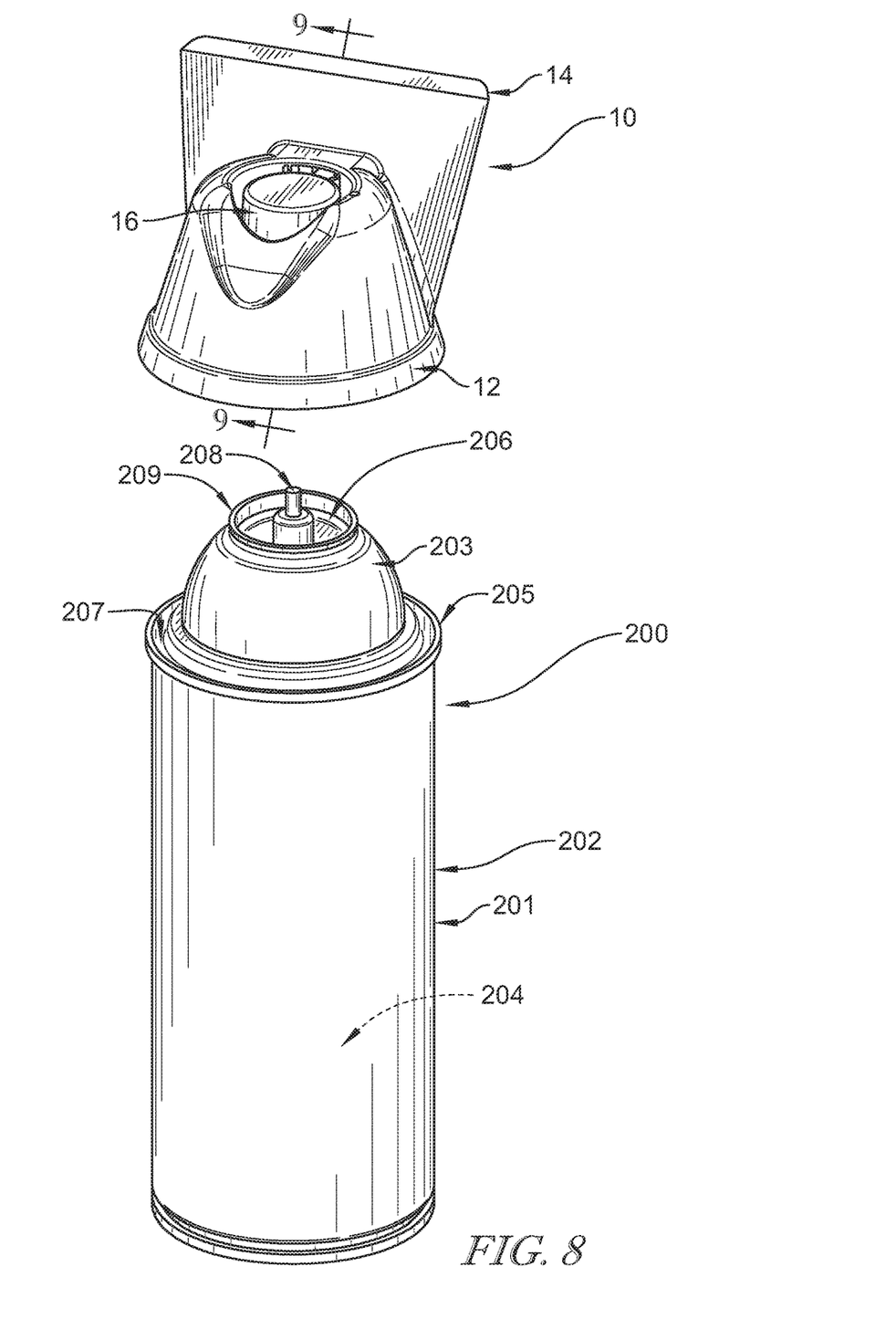
FIG. 8 is a perspective view of the dispenser cap of FIG. 1 showing the dispenser cap positioned over another embodiment of a spray can before mounting of the dispenser cap on the spray can.

Another embodiment of a spray can 200 includes a container 202 formed to define an interior storage region 204 and a valve 206 coupled to container 202 as suggested in FIG. 8. Valve 206 seals interior storage region 204 to allow pressurized fluid, such as a de-icer compound, to be stored in container 202 and selectively dispensed through valve 206. Valve 206 and container 202 meet at a rim 209. In some embodiments, valve 206 and container 202 are formed separately and joined together. In some embodiments, rim 209 is formed at a rolled joint between valve 206 and container 202. In the illustrative embodiment, container includes a cylindrical wall 201 and a top wall 203 coupled to cylindrical wall 201 at a seam 205. A recess 207 is formed between seam 205 and top wall 203. In some embodiments, top wall 203 and cylindrical wall 201 are formed separately and joined together. In some embodiments, seam 205 is formed at a rolled joint between top wall 203 and cylindrical wall 201.

Figure 9:
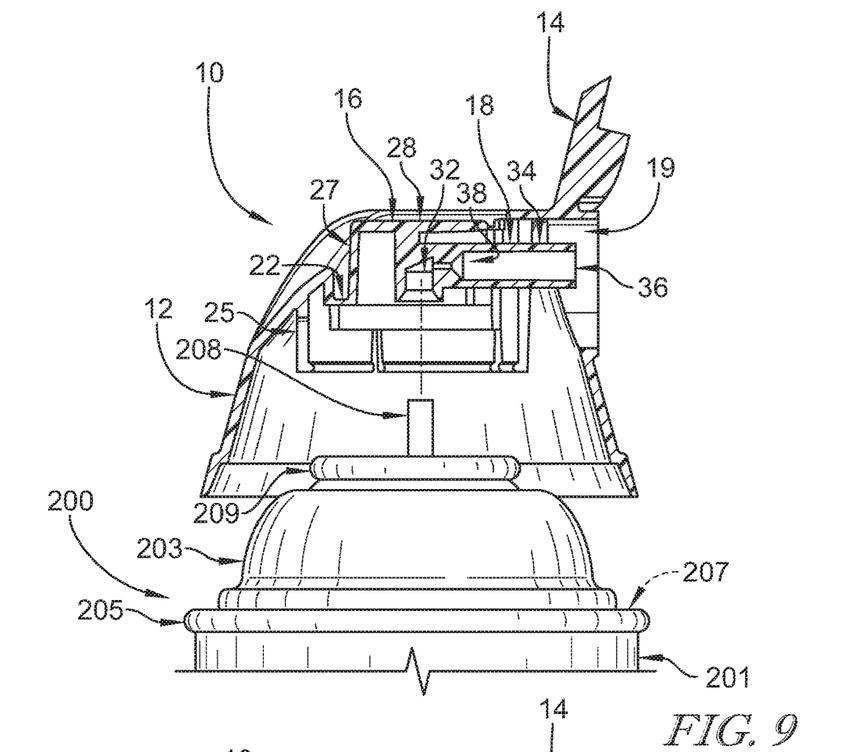
FIG. 9 is a sectional view of the dispenser cap taken along line 9-9 in FIG. 8 showing a valve stem of the spray can aligned with the valve-stem receiver of the dispenser cap during mounting of the dispenser cap on the spray can.
Figure 10:
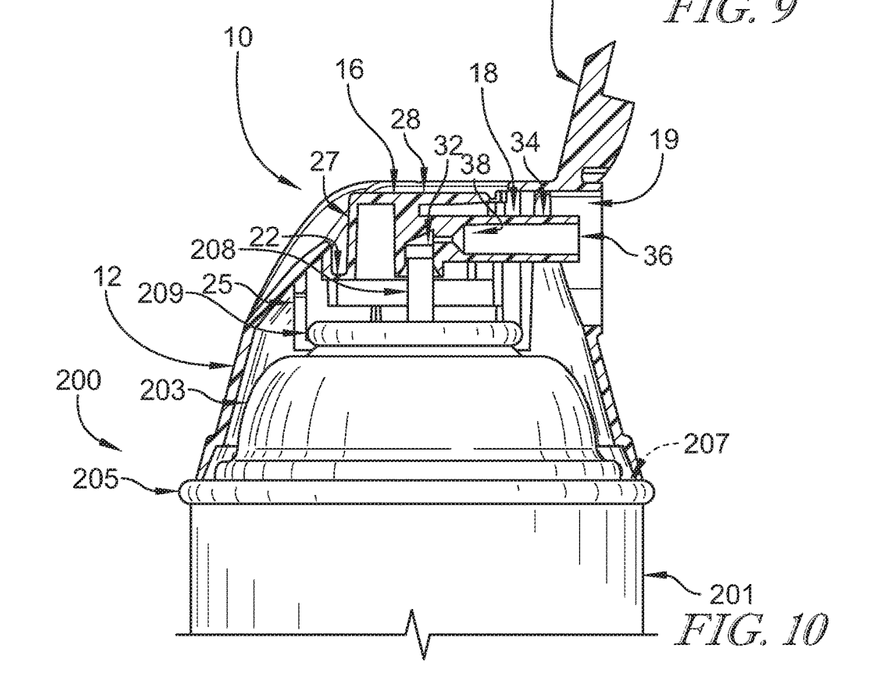
FIG. 10 is a view similar to FIG. 9 showing the dispenser cap mounted on the spray can such that the valve stem extends in to the valve-stem receiver and suggesting that the mount ring engages with the rim of the spray can to hold the dispenser cap on the spray can and that the shell extends into a recess of the spray can.

Mount ring 25 of de-icer dispenser cap 10 is configured to engage with rim 209 to hold de-icer dispenser cap 10 on spray can 200 and form a de-icer system as suggested in FIGS. 9 and 10. Shell 12 extends along top wall 203 and at least partially surrounds valve 206. A lower end of shell 12 is received in recess 207. A valve stem 208 of valve 206 is received in valve-stem receiver 32 when de-icer dispenser cap 10 is mounted on spray can 200. A user engages button grip 28 to depress fluid-delivery controller 16 and move valve stem 208 to allow pressurized fluid within spray can 200 to flow through valve 206 and nozzle 18.

In some embodiments, a user dispenses de-icer compound from spray can 100, 200 onto a window having ice thereon to at least partially melt or soften the ice to allow for easier removal. The user engages the ice with scraper 14 to loosen the ice from the window. In some embodiments, the de-icer compound includes Methyl Alcohol (Methanol) and/or Ethylene Glycol in various percentages.

Figures 11, 12, 13:
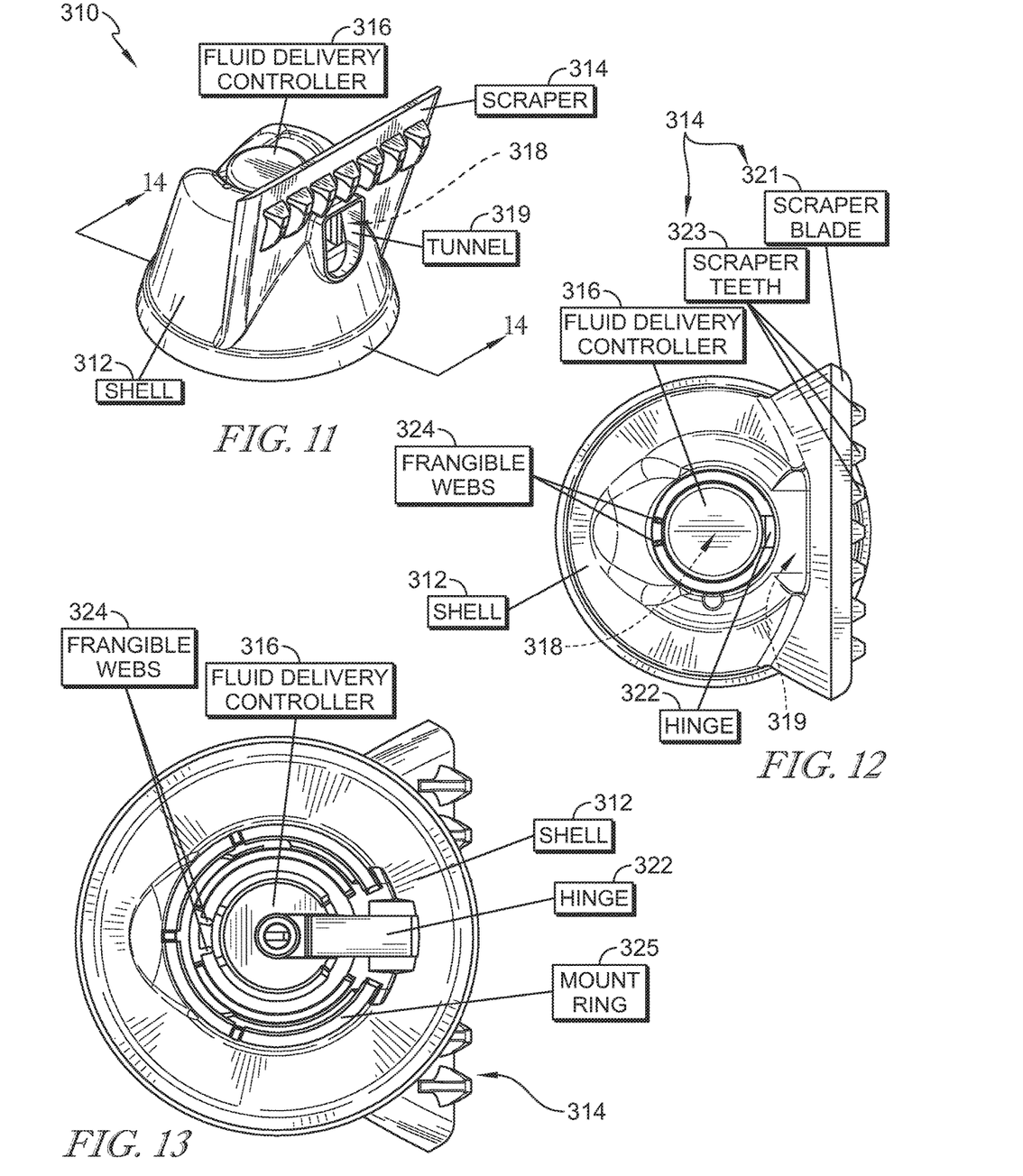
FIG. 11 is an upper perspective view of another embodiment of a de-icer dispenser cap in accordance with the present disclosure showing that the dispenser cap includes a shell, a scraper extending upward from the shell, and a fluid-delivery controller coupled to the shell.
FIG. 12 is a top plan view of the dispenser cap of FIG. 11 showing that the scraper includes a scraper blade coupled to the shell and scraper teeth coupled to the blade.
FIG. 13 is a bottom plan view of the dispenser cap of FIG. 12 showing that the fluid-delivery controller is coupled to the shell by a hinge for movement relative to the shell and frangible webs coupled to the shell and suggesting that the fluid-delivery controller is formed unitary with the shell.

Another embodiment of a de-icer dispenser cap 310 in accordance with the present disclosure includes a dome-shaped shell 312, a scraper 314 extending upward from shell 312, and a fluid-delivery controller 316 coupled to shell 312 as shown in FIG. 11. Shell 312, scraper 314, and fluid-delivery controller 316 are unitary and integrally molded together as suggested in FIG. 14. De-icer dispenser cap 310 is configured to mount on a spray can to form a de-icer system similar to de-icer dispenser cap 10 shown in FIGS. 1-10. Fluid-delivery controller 316 is configured to dispense the pressurized contents of the spray can, such as a de-icer compound, through a nozzle 318 at the selection of a user to aid in the removal of ice from a car window, for example, using scraper 314.

Shell 312 is formed to include a tunnel 319 as shown in FIG. 11. Nozzle 318 of fluid-delivery controller 316 is aligned with tunnel 319 to project the pressurized contents of the spray can from nozzle 318 through tunnel 319. In some embodiments, tunnel 319 cooperates with nozzle 318 to generally direct pressurized fluid in a single direction and to block peripheral spray of the pressurized fluid. Scraper 314 includes a scraped blade 321 and scraper teeth 323 coupled to scraper blade 321 as suggested in FIG. 12. Scraper blade 321 and scraper teeth 323 form cutting edges configured to engage with and break apart ice formed on a car window, for example.

A mount ring 325 is coupled to shell 312 and generally concentric with fluid-delivery controller 316 as suggested in FIG. 13. Mount ring 325 is configured to engage with the spray can to hold de-icer dispenser cap 310 on the spray can such that fluid-delivery controller 316 is engaged with a valve stem of the spray can. Fluid-delivery controller 316 is coupled to shell 312 by a hinge 322. One or more frangible webs 324 extend from fluid-delivery controller 316 and engages with shell 312. Hinge 322 and frangible webs 324 integrally connect fluid-delivery controller 316 with shell 312. De-icer dispenser cap 310 is formed such that shell 312 and fluid-delivery controller 316 are unitary which eliminates one or more steps in a manufacturing process for a fluid-delivery controller to be assembled with a shell. In some embodiments, de-icer dispenser cap 310 is formed by injection molding as a single, unitary structure.

Figure 14:
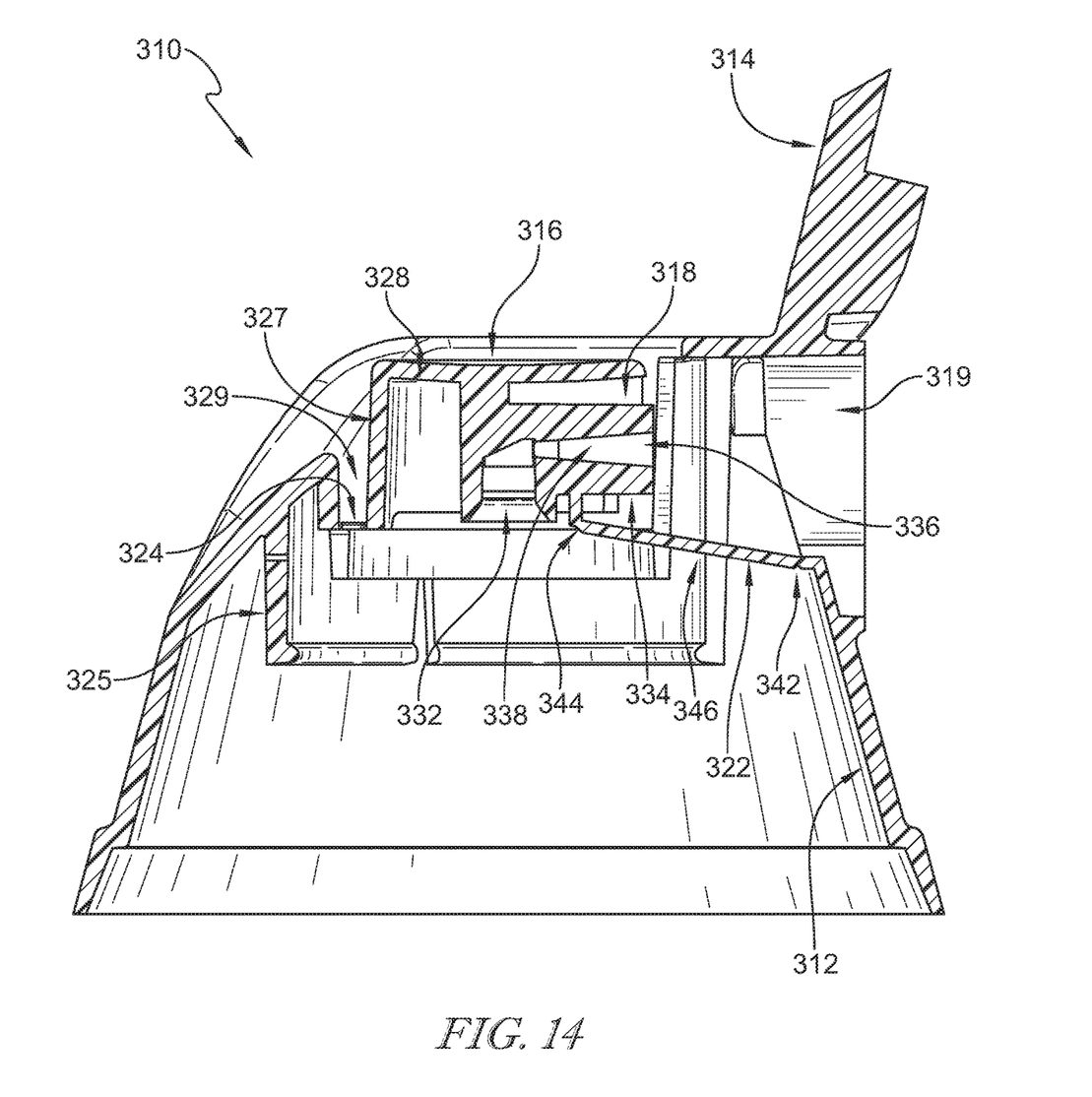
FIG. 14 is a sectional view of the dispenser cap taken along line 14-14 in FIG. 11 showing that the hinge includes two points of flexibility to allow the fluid-delivery controller to move linearly relative to the shell.

Hinge 322 is configured to allow fluid-delivery controller 316 to move relative to shell 312 as suggested in FIG. 14. Frangible webs 324 are configured to limit movement of fluid-delivery controller 316 during shipping of de-icer dispenser cap 310 and during assembly of de-icer dispenser cap 310 with the spray can to form a de-icer system. Frangible webs 324 are also configured to break away from support shell 312 when a user engages fluid-delivery controller 316 to dispense the contents of the spray can for the first time.

Fluid-delivery controller 316 includes a button wall 327 coupled to hinge 322 and a button grip 328 coupled to button wall 327 as shown in FIG. 14. Button wall 327 extends into a button aperture 329 of shell 312 to engage with hinge 232. Nozzle 318 is coupled to button grip 328. Nozzle 318 includes a valve-stem receiver 332 coupled to button grip 328 and a spout 334 extending from valve-stem receiver 332 toward tunnel 319. An outlet aperture 336 of spout 334 is fluidly connected to valve-stem receiver 332 by a passageway 338 such that fluid can be delivered through valve-stem receiver 332 and out of outlet aperture 336. A bridge 346 of hinge 322 attaches to shell 312 at a first pivot point 342 and attaches to fluid-delivery controller 316 at a second pivot point 344. First and second pivot points 342, 344 allow fluid-delivery controller 316 to move along a linear path relative to shell 312 as guided by bridge 346.

The invention claimed is:

1. A de-icer dispenser cap for use with a spray can, the de-icer dispenser cap comprising:
a shell including a downwardly extending sidewall formed to include an opening and a tunnel having a sidewall extending radially inward from the opening,
a mount ring having an downwardly extending annular skirt that is spaced radially inwardly from the sidewall of the shell, the mount ring is configured to hold the de-icer dispenser cap on the spray can the skirt of the mount ring formed to include an opening,
a scraper extending from the shell, and
a fluid-delivery controller including a button wall positioned radially inwardly from the mount ring, a button grip coupled to the button wall, and a nozzle configured to extend through the opening in the skirt of the mount ring and into the tunnel of the shell, a bridge extending between the shell and the fluid-delivery controller to couple the fluid delivery controller to the shell and to allow the fluid-delivery controller to move relative to the shell, the bridge is attached to the shell at a first pivot point outside of the mount ring and attached to the fluid-delivery controller at a second pivot point inside the mount ring, the bridge extending through the opening in the mount ring, the fluid-delivery controller configured to dispense pressurized fluid from the spray can through the nozzle at the selection of a user, wherein the shell, the scraper, and the fluid-delivery controller are unitary, and
a frangible web extending from the fluid-delivery controller to the shell opposite from the bridge, and wherein the frangible web is configured to break away when the fluid-delivery controller is depressed for the first time relative to the shell.

2. The de-icer dispenser cap of claim 1, wherein the scraper includes a blade coupled to the shell and one or more teeth formed on the blade.

3. The de-icer dispenser cap of claim 1, wherein the nozzle includes a valve-stem receiver coupled to the button grip and a spout coupled to the valve-stem receiver, and wherein the valve-stem receiver is configured to engage with a valve stem of the spray can.

4. A de-icer system comprising:
a spray can having a container formed to define an interior storage region and a valve coupled to the container to seal the interior storage region of the container, the valve configured to selectively dispense pressurized fluid from the interior storage region through a valve stem, and
a de-icer dispenser cap comprising:
a shell including a downwardly extending sidewall formed to include an opening and a tunnel having a sidewall extending radially inward from the opening,
a mount ring having an downwardly extending annular skirt that is spaced radially inwardly from the sidewall of the shell, the mount ring configured to hold the de-icer dispenser cap on the spray can the skirt of the mount ring formed to include an opening,
a scraper extending from the shell, and
a fluid-delivery controller including a button wall positioned radially inwardly from the mount ring, a button grip coupled to the button wall, and a nozzle configured to permit the flow of fluid through the opening in the skirt of the mount ring and into the tunnel of the shell, a bridge extending between the shell and the fluid-delivery controller to couple the fluid delivery controller to the shell, the bridge is attached to the shell at a first pivot point and attached to the fluid-delivery controller at a second pivot point, the bridge extending through the opening in the mount ring, the fluid-delivery controller configured to dispense pressurized fluid from the spray can through the nozzle at the selection of a user, wherein the shell, the scraper, and the fluid-delivery controller are unitary with one another, and
a frangible web extending from the fluid-delivery controller to the shell opposite from the bridge, and wherein the frangible web is configured to break away when the fluid-delivery controller moves relative to the shell for the first time.

5. The de-icer system of claim 4, wherein the nozzle includes a valve-stem receiver coupled to the button grip and a spout coupled to the valve-stem receiver, and wherein the valve-stem receiver is configured to engage with the valve stem of the spray can.

6. The de-icer system of claim 4, wherein the scraper includes a blade coupled to the shell and one or more teeth formed on the blade.

7. The de-icer dispenser cap of claim 4, wherein the nozzle includes a valve-stem receiver coupled to the button grip and a spout coupled to the valve-stem receiver, and wherein the valve-stem receiver is configured to engage with a valve stem of the spray can.

\* \* \* \* \*